(12) United States Patent
Paetsch et al.

(10) Patent No.: US 9,565,051 B2
(45) Date of Patent: Feb. 7, 2017

(54) METHOD FOR TRANSMITTING DATA TO AT LEAST ONE COMMUNICATIONS END SYSTEM AND COMMUNICATIONS DEVICE FOR CARRYING OUT SAID METHOD

(75) Inventors: Frank Paetsch, Berlin (DE); Christian Marhoff, Berlin (DE)

(73) Assignee: TELES AG INFORMATIONSTECHNOLOGIEN, Berlin (DE)

( * ) Notice: Subject to any disclaimer, the term of this patent is extended or adjusted under 35 U.S.C. 154(b) by 2465 days.

(21) Appl. No.: 11/813,540

(22) PCT Filed: Jan. 10, 2006

(86) PCT No.: PCT/DE2006/000043
§ 371 (c)(1),
(2), (4) Date: Jul. 31, 2007

(87) PCT Pub. No.: WO2006/074649
PCT Pub. Date: Jul. 20, 2006

(65) Prior Publication Data
US 2008/0281928 A1    Nov. 13, 2008

(30) Foreign Application Priority Data

Jan. 11, 2005  (DE) .................. 10 2005 001 351

(51) Int. Cl.
*G06F 15/16* (2006.01)
*H04L 29/06* (2006.01)
*H04L 12/58* (2006.01)

(52) U.S. Cl.
CPC ......... *H04L 29/06027* (2013.01); *H04L 12/58* (2013.01); *H04L 65/1026* (2013.01); *H04L 65/1036* (2013.01); *H04M 2203/4536* (2013.01)

(58) Field of Classification Search
CPC .................................................. G10L 15/1822
(Continued)

(56) References Cited

U.S. PATENT DOCUMENTS 4,829,554 A * 5/1989 Barnes et al. ............. 455/432.1
4,837,798 A    6/1989 Cohen et al.
(Continued)

FOREIGN PATENT DOCUMENTS

DE    197 28 878 A1    1/1998
DE    100 59 327 A1    6/2002
(Continued)

OTHER PUBLICATIONS

"Context-Aware Unified Communication"—IEEE, Jan. 2004 http://ieeexplore.ieee.org/document/1263064/?reload=true.*
(Continued)

*Primary Examiner* — Randy Scott
(74) *Attorney, Agent, or Firm* — Vorys, Sater, Seymour and Pease LLP; Vincent M DeLuca

(57) ABSTRACT

The invention relates to a method for transmitting data to at least one communications end system, and to a communications device for carrying out said method. The inventive method comprises the following steps: providing a dataset that is meant to be transmitted to at least one communications end system (4); integrating at least one destination address into said dataset, one destination address identifying one communications end system (4) each; transmitting the dataset via a first communications network (3) to a communications device (1); converting the dataset to a speech signal unless the dataset already comprises a speech signal; establishing a respective connection from the communications device (1) via the first (3) or a second communications network (51, 52, 53) to a communications end system (4) while using the corresponding destination address; transmit-
(Continued)

ting the speech signal from the communications device (1) to the communications end system (4) upon acceptance of the connection; and playing back the speech signal in the communications end system (4). The first communications network (3) is a packet-switched network and the dataset is transmitted as an e-mail to the communications device (1).

29 Claims, 1 Drawing Sheet

(58) Field of Classification Search
USPC .......... 709/206, 207; 455/466; 704/200, 275
See application file for complete search history.

(56) References Cited

U.S. PATENT DOCUMENTS

| | | | |
|---|---|---|---|
| 5,692,032 A * | 11/1997 | Seppanen et al. ............ 455/466 |
| 5,699,426 A * | 12/1997 | Tsukamoto et al. .......... 380/240 |
| 5,911,129 A * | 6/1999 | Towell .................. G10L 13/033 704/223 |
| 5,974,044 A * | 10/1999 | Ikeda et al. ................... 370/354 |
| 6,111,866 A * | 8/2000 | Kweon et al. ................ 370/335 |
| 6,449,343 B1 | 9/2002 | Henderson |
| 6,708,217 B1 | 3/2004 | Colson et al. |
| 6,724,864 B1 | 4/2004 | Denenberg et al. |
| 7,027,568 B1 * | 4/2006 | Simpson et al. ............ 379/88.16 |
| 2001/0021186 A1 * | 9/2001 | Ono et al. ..................... 370/352 |
| 2002/0162116 A1 * | 10/2002 | Read et al. ................... 725/106 |
| 2002/0176376 A1 * | 11/2002 | Bertino ......................... 370/278 |
| 2004/0015344 A1 * | 1/2004 | Shimomura et al. ......... 704/200 |
| 2004/0093392 A1 * | 5/2004 | Nagamatsu et al. .......... 709/218 |
| 2004/0196798 A1 * | 10/2004 | Abousleman ................. 370/316 |
| 2004/0218751 A1 * | 11/2004 | Colson .................... H04M 3/51 379/265.09 |
| 2005/0226218 A1 * | 10/2005 | Berkowitz et al. ........... 370/352 |
| 2005/0227674 A1 * | 10/2005 | Kopra et al. ................ 455/414.1 |
| 2006/0274712 A1 * | 12/2006 | Malladi et al. ............... 370/345 |
| 2008/0051120 A1 * | 2/2008 | Vieri et al. .................... 455/466 |

FOREIGN PATENT DOCUMENTS

| | | |
|---|---|---|
| DE | 101 27 415 A1 | 12/2002 |
| DE | 102 01 407 A1 | 8/2003 |
| DE | 102 09 061 A1 | 9/2003 |
| EP | 0 935 379 A2 | 8/1999 |
| EP | 1 130 893 A1 | 9/2001 |
| WO | 98/48560 A1 | 10/1998 |
| WO | 0008832 A1 | 2/2000 |
| WO | 01-36522 A1 | 5/2001 |

OTHER PUBLICATIONS

Applewhite, The BlackBerry Business, IEEE Pervasive Computing, Apr.-Jun. 2002, pp. 4-7, IEEE Computing Society, Los Alamitos, CA.
Kuntze, Unified Messaging, Funkschau, May 1999, pp. 18-23, WEKA technical periodical publishing house GmbH, Germany.
Lei et al., Context-Aware Unified Communication, Proceedings of the 2004 IEEE International Conference on Mobile Data Management, Jul. 2004, pp. 1-11, IEEE Computer Society.
Zarri, Future Service Capabilities Offered by the 3GPP System, The Institution of Electrical Engineers, 2003, pp. 354-358, IEE, Stevenage, United Kingdom.
German Notification dated Jul. 16, 2014.

* cited by examiner

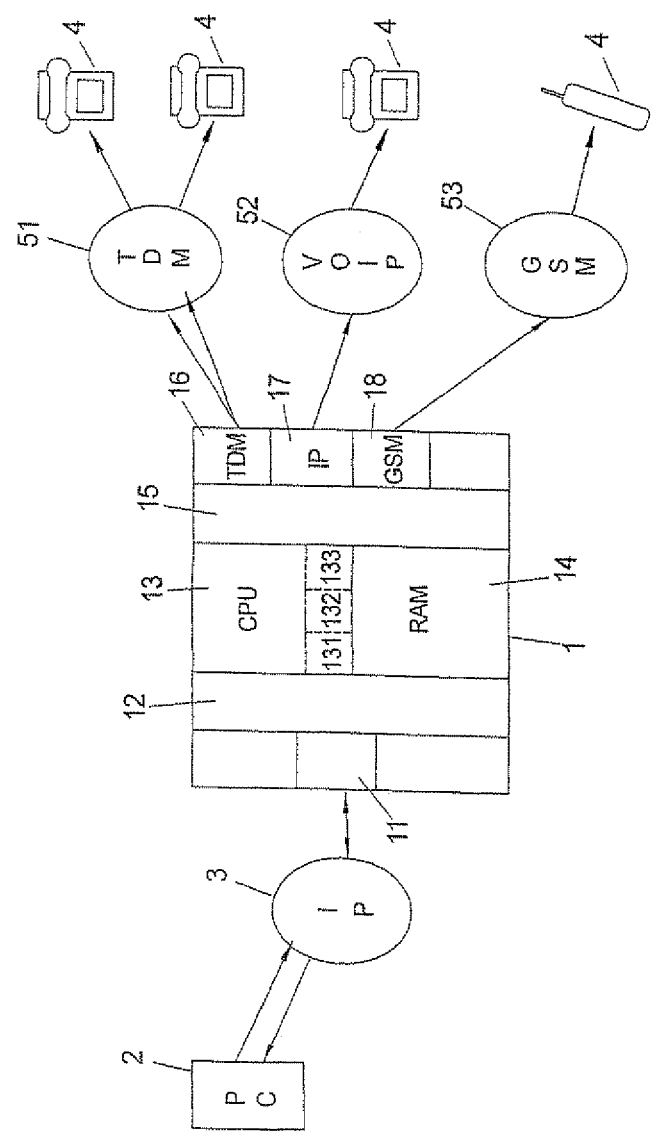

METHOD FOR TRANSMITTING DATA TO AT LEAST ONE COMMUNICATIONS END SYSTEM AND COMMUNICATIONS DEVICE FOR CARRYING OUT SAID METHOD

The invention relates to a method for transmitting data to at least one communication end system and a communication device for carrying out the method. In particular, the invention relates to the automatic playback on a communication end system of voice signals for information which is contained in an e-mail.

BACKGROUND TO THE INVENTION

Systems and methods are known in which a voice recording is sent as an attachment to an e-mail and a receiver of the e-mail can listen to this voice recording locally.

In addition, systems and methods are known which convert an SMS message sent to a landline number into a voice message and which transmit the voice message to the landline number in the course of an ordinary telephone connection.

OBJECT OF THE INVENTION

The present invention is based on the object of providing a method for transmitting data to at least one communication end system and a communication device for carrying out the method which are able to be used for effectively transmitting information to communication end systems which is in the form of text information or audio information.

SUMMARY OF THE INVENTION

The invention achieves this object by means of a method having the features of claim 1 and a communication device having the features of claim 25. Preferred and advantageous refinements of the invention are specified in the subclaims.

Accordingly, the solution based on the invention provides for a volume of data which needs to be transmitted to at least one communication end system to be provided first. The volume of data is, in particular, text data or digitized audio data containing a particular piece of information for at least one user of a communication end system. In this case, the volume of data incorporates the reception addresses for those communication end systems to which the volume of data needs to be transmitted. In the case of one receiver, a reception address is therefore incorporated in the volume of data too, and with a plurality of receivers a list of reception addresses.

The volume of data is first of all transmitted via a first communication network as an e-mail to a communication device. The first communication network is a packet-switched network, particularly the Internet. The communication device or a device associated therewith converts the volume of data into a voice signal provided that the volume of data does note already contain a voice signal. By way of example, text data appended to the e-mail as an attachment or contained in the e-mail are converted into a voice signal by means of a piece of voice generation software. If the volume of data already contains a voice signal (e.g. if the e-mail has an audio file appended to it) then this voice signal is merely via the first or a second communication network to each communication end system whose reception address is contained in the volume of data. Following setup of the connection and acceptance of the connection by the relevant communication end system, the voice signal is transmitted from the communication device to the communication end system and the voice signal is played back.

The solution based on the invention allows receiver addresses contained in the volume of data to be taken as a basis for setting up one or more calls and playing back a particular voice message, corresponding to a text message or audio file contained in the volume of data, on one or more end systems. It therefore becomes possible to send messages to single subscribers or a plurality of subscribers and to play back the messages in the form of voice information automatically for the subscribers.

The second circuit-switched network is, by way of example, a circuit-switched network, for example a TDM telecommunication network, where the voice signal is transmitted to a communication end system by means of circuit switching. It may likewise be a mobile radio network. In another variant, data are transmitted from the communication device to the communication end system using VoIP technology using a packet-switched network. In this case, the communication device may have a plurality of interfaces, so that said networks can be used selectively and on the basis of the reception addresses.

In one preferred refinement of the inventive method, upon successful playback of the signal on the telecommunication end system an acknowledgement is In this context, the acknowledgement can be transmitted as an inband signal or alternatively as an out-of-band signal (inband signaling or out-of-band signaling). Examples of inband signaling are the generation of a DTMF signal or the transmission of a voice signal via the existing connection, with the DTMF signal being evaluated by a DTMF recognition unit and the voice signal being evaluated by a voice recognition unit with the receiver of the acknowledgement information. An example of out-of-band signaling is the transmission of a piece of acknowledgement information via the Internet.

In a first refinement, the acknowledgement about successful playback of the signal on the communication end system is transmitted to the communication device and then from this to the sender of the volume of data. In a second refinement, the acknowledgement is transmitted directly to the sender of the volume of data without involving the communication device, in which case the sender address is transmitted together with the voice signal from the communication device to the communication end system, for example as part of signaling information which needs to be interchanged upon call setup. The acknowledgement is always transmitted as an out-of-band signal in the second refinement.

In one refinement of the invention, the voice signal has voice information added to it with instructions regarding how to acknowledge reception of the voice signal, or the voice signal already contains such information. By way of example, the voice signal contains, from the outset, the information that a particular key needs to be pressed in order to acknowledge reception of the voice message, or such information is added to the actual voice signal in the communication device. In this way, it is possible to ensure that reception of the voice signal is detected at a low error rate.

In another refinement, a semantically interpretable response from the user of the end system to the voice signal is detected and evaluated. The detected information thus relates not only to the voice signal having been played back successfully but also to the detection of a semantic content in the response from the user. In a first variant of this, the voice signal has voice information added to it with instructions regarding how the user of the communication end system can respond to the voice signal, or the voice signal already contains such information. In particular, the user can be informed of a plurality of alternative reaction options and triggering thereof. The first example of this is a piece of voice information regarding how the user of the communication end system produces a YES response or a NO response. By way of example, the information is sent that the user needs to press a particular key in order to respond "YES" and needs to press a particular other key in order to respond "NO". However, the questions may also be of differentiated nature and may prescribe more than two or other alternatives for the user. By way of example, the information is sent that the user needs to press a particular key if he can meet a condition A (such as being at an accident scene in the time of 5 minutes) and needs to press a particular other key if he can meet a particular other condition B (such as being at an accident scene in a time of 10 minutes), etc.

In a second variant, a voice response from the user of the communication end system is detected and is evaluated by means of voice recognition.

A Busy situation or nonacceptance of the call involves an attempt preferably being made by the communication device to set up a fresh connection after a particular time, and the current status is preferably communicated to the sender of the volume of data. If the communication end system accepts a call using a telephone answering machine then the voice signal is preferably spoken onto the telephone answering machine. This is also preferably communicated to the sender of the volume of data.

Generally, provision is preferably made for the sender of the volume of data to be informed by the communication device of the state of the connection setup and the transmission of the voice signal to the communication end system. This is done particularly by sending data packets via the first communication network.

The communication device based on the invention has a first interface for receiving data sent as an e-mail from a packet-switched network, at least one second interface for transmitting voice signals, and a device which converts data received from the first interface into voice signals, provided that they are not yet in the form of voice signals, and forwards them to the at least one interface for transmitting voice signals. In this case, the first interface is preferably a data packet interface which receives packetized data.

In this context, the device preferably comprises a data packet reception unit which recognizes text contained in the received data or digital audio data contained in the received data and makes it/them available for further treatment. In a first preferred variant, the text is received as an e-mail in this context, with the data packet reception unit recognizing text in e-mail files and making it available for further treatment. In a second preferred variant, the data packet reception unit recognizes digital audio data in the attachment to an e-mail and makes them available for further treatment.

In addition, the device preferably comprises a message playback unit which converts a text message internally into a voice signal and digitally encodes the converted voice signal. Provided that the received data already contain audio data, these are checked in the message playback unit to determine whether format conversion and/or conditioning and/or other treatment is necessary for further use in the event of transmission via a telecommunication network, and such processing is performed if appropriate. The voice signal in digital form is then forwarded to the interface for transmitting voice signals and is transmitted from there to at least one communication end system.

The communication device preferably likewise comprises a unit for interpreting inband and/or out-of-band information. This information is used to recognize acknowledgements or other reactions which have been sent by a communication end system by means of inband signal or by means of out-of-band signal in response to a voice signal which has been played back, to evaluate them and to communicate them to the sender of the volume of data.

In addition, the communication device preferably incorporates a unit for connection control which controls the call setup and any data transmission to communication end systems to which the voice signals are to be transmitted, a call being set up using receiver information which has been appended to the data received via the first interface. In this case, the connection setup is effected in standard form on a basis of the networks involved (e.g. landline network, mobile radio network or packet-switched network using VoIP technology).

DESCRIPTION OF A PREFERRED EXEMPLARY EMBODIMENT

The invention is explained in more detail below using an exemplary embodiment with reference to the FIGURE of the drawing.

The single FIGURE schematically shows a telecommunication arrangement having a communication device for converting text data into voice signals on the interface of at least two communication networks.

The communication device 1 is connected via a first interface 11 to a packet-switched network 3 and via a plurality of second interfaces 16, 17, 18 to a circuit-switched TDM telecommunication network 51, a packet-switched network 52 and a mobile radio network 53.

The first interface 11 is a data packet interface which can be used to receive data packets from the packet-switched network 3 and to transmit them to the packet-switched network 3. The packet-switched network 3 is the Internet, for example. By way of example, the packet-switched interface 11 is in the form of an Ethernet interface. The packet-switched network 3 has a multiplicity of end systems 2 connected to it, one of which is shown as a PC 2 by way of example. The end systems are connected to the packet-switched network 3 via an Internet service provider or directly via a DSL connection, for example.

The second interfaces 16, 17, 18 are in the form of voice transmission interfaces, i.e. they allow voice data to be transmitted to terminals 4 which are connected to the networks 51, 52, 53. In this context, the integration of three interfaces 16, 17, 18 into the communication device 1 is to be understood merely by way of example. Alternatively, it is also possible to provide just a single interface (for example a TDM interface) or else additional interfaces (for example for different mobile radio networks).

The communication device 1 is used to convert text data received from the packet-switched network 3 into voice information and to transmit this voice information to at least one terminal 4 which is connected to one of the communication networks 51, 52, 53.

To implement this functionality, the communication device 1 also has, besides the aforementioned interfaces 11, 16, 17, 18, a data packet reception unit 12, a central control unit 13 with an integrated memory 14 and optionally a switching matrix 15. The central control unit 13 is preferably in the form of a microprocessor (CPU) and, together with an appropriate piece of software, implements a message playback unit 131, a unit for connection control 132 and an inband and/or out-of-band interpretation unit 133, which are indicated by the dotted blocks in the FIGURE. Furthermore, the data packet reception unit 12 and the switching matrix 15 may also be implemented by software which is executed by the control unit 13. In addition to preferred implementation of said functional units by software in conjunction with a CPU, the respective functionalities may alternatively also be implemented in the form of hardware, however.

The data packet reception unit 12 identifies a text in one or more data packets, which are possibly put together again, and makes it available to the message playback unit 131. The message playback unit 131 has a piece of voice generation software which converts text data into a voice signal or voice information. In this case, the voice signals are naturally not in analog form, however, but rather are in digital form. They are put onto PCM pulse frames, for example.

The unit for connection control 132 performs signaling, in a manner which is known per se, via the relevant interface 16, 17, 18 and the respective communication network 51, 52, 53 to a called end system 4 to which the voice information needs to be transmitted. In this context, the target address (e.g. the telephone number of the called end system 4) is also contained in the data packets received from the packet-switched network 3. Provided that the voice information is to be transmitted to a multiplicity of end systems 4, the data packets received from the packet-switched network 3 contain a list of receiver addresses, for example a list of telephone numbers for end systems 4 which are to be called.

The operation of the inband/out-of-band interpretation unit 133 is explained in detail further below when explaining the method sequence.

The switching matrix 15, which is provided optionally, provides a plurality of outputs to which the data to be transmitted can be sent. A switching matrix is provided particularly when the communication device 1 performs additional tasks of a switch.

For connection setup via the TDM interface 16, the data are transmitted via the TDM network 51 to the end system 4 by means of circuit switching. For connection setup via the IP interface 17, the voice data are first of all packetized and transmitted to a packet-switched network 52. In this case, the packet-switched network 52 may be the same packet-switched network as the packet-switched network 3 via which the text information was received. Data are transmitted to the end system 4 using inherently known VoIP (Voice over IP) techniques. For connection setup and subsequent data transmission via the GSM interface 18, the data are transmitted to the (mobile radio) end system 4 via a mobile radio network 53.

The method implemented by the telecommunication infrastructure described is described by way of example below. In this context, it will be assumed that the end system 2 needs to transmit a particular piece of information to a multiplicity of end systems 4. The information is available in the end system 2 as text information, for example as a text file.

In this respect, it is a volume of data. In this case, the volume of data also contains the addresses of the receivers to which the text information needs to be sent. The volume of data is transmitted to the communication device 1 via the packet-switched network 3. This is preferably done using an e-mail which the end system 2 sends to the communication device 1. In this context, the data in question are either contained in the e-mail directly or are an attachment to an e-mail. For data transmission via the packet-switched network 3, the volume of data is packetized into one or more data packets.

The data packets forming the volume of data or the e-mail are detected via the data packet interface 11 of the communication device 1 and are supplied to the message playback unit 12. This identifies the actual text message in the received e-mail and makes this text message available to the message playback unit 131. The message playback unit 131 converts the text message into a voice message, with the relevant voice data being provided in the form of PCM data, for example (in line with ITU-T Recommendation G.711).

The device 132 for connection control now uses the reception address or the reception addresses appended to the received volume of data to set up one or more telecommunication connections to one or more end systems 4. This is done using at least one of the interfaces 16, 17, 18 and at least one of the communication networks 51, 52, 53. In addition, the switching matrix 15 can be activated.

Following setup of a connection to the respective end systems 4, the voice information is then transmitted to the end system 4 via the respective second interface 16, 17, 18. The end system 4 audibly reproduces the message. In particular, the end system 4 is a digital or analog telephone, a mobile radio terminal or a PC with a piece of telephony software.

During connection setup and data transmission, the communication unit 1 preferably communicates with the sender 2, particularly with regard to the status of the connection setup and possibly the transmission of information which the end system 4 sends in response to the voice message which has been played back.

Thus, provision is preferably made for the called end system 4 to acknowledge receipt of a voice announcement by sending a signaling command. This signaling command can be transmitted by means of inband or out-of-band signaling. By way of example, inband signaling is a DTMF tone or a piece of voice information which is recognized by the communication unit 1, and there particularly by the inband/out-of-band interpretation unit 133. The inband information is transmitted over the existing connection between the communication device 1 and the end system 4. Alternatively, the acknowledgement can be transmitted to the unit 133 as out-of-band information, for example as an e-mail or another piece of information sent via the Internet.

In this case, provision is preferably made for the acknowledgement not just to contain an acknowledgement of the fact that the announcement in question has been played back successfully. In addition, the acknowledgement may also contain a semantically interpretable response to an announcement, particularly a YES response or a NO response. In this context, the voice announcement may additionally contain the information regarding which key or key combination the user needs to operate in order to produce a YES response or a NO response.

This is explained in more detail by way of example for the situation in which the PC 2 is an alert center for the voluntary fire brigade and the volume of data which is sent contains the text information that a fire has broken out at location X. The information is sent to a plurality of end systems 4 by users who are part of the voluntary fire brigade. The relevant address list has been appended to the volume of data. The communication device 1 converts the text information into a corresponding piece of voice information and sends it to the members of the voluntary fire brigade for the relevant location. In this case, the communication device 1 appends additional information for controlling the response to the voice message, for example the voice information: "If you are available for fire fighting, please press "1"; if you are not available for fire fighting, please press "2"". Original voice information is sent together with this additional information to the individual subscribers. In another variant, the additional information is already incorporated in the original voice information too.

The subscribers or end systems 4 react in appropriate fashion to the message and to the request for a response (i.e. by pressing one or the other key), and the response is then transmitted to the inband/out-of-band interpretation unit 133 and is forwarded therefrom to the alert center 2, so that the latter can establish within a very short time who is available for fire fighting.

If connection setup is unsuccessful, for example because the called subscriber is busy, the call is not accepted or just the telephone answering machine answers, this information is likewise transmitted to the alert center 2.

In a simpler version of the method described, the called subscriber merely sends notification that he has received the call. For this case, the actual message merely has the following voice message appended to it, for example: Please press key "3" if you have heard this message. This acknowledgement information is then also forwarded to the original sender 2, so that the latter can keep account of who has received the message.

Examples of other preferred applications are the generation of information calls, for example to say that the called subscriber's motor vehicle has now finished being repaired, or to say that a particular product is available for collection. Another preferred application is voice advertisement within the legally permitted limits.

In one alternative refinement, the voice message transmitted to the end system 4 is also informed directly of the sender address of the sending end system 2 by means of the signaling information transmitted when the connection is set up, which means that an acknowledgement (in that case using out-of-band signaling) can also be transmitted directly to the sending end system 2, bypassing the communication device 1.

In the exemplary embodiment shown, the communication device 1 is arranged at the transition between various networks 3, 51, 52, 53 and in this regard is a gateway. The communication device 1 may also be implemented in a switch, a router or else with the subscriber in a telecommunication installation or a local server, however.

In a modification of the exemplary embodiment described, the original volume of data sent by the end system 2 already contains a voice signal, for example in the form of a digital audio file which has been appended to an e-mail as an attachment. In this case, the communication device 1 no longer needs to perform any conversion into a voice signal. Instead, the data reception unit 12 recognizes the audio file and transfers it to the message playback unit 131. This then merely checks whether the audio file requires format conversion and/or conditioning. Such processing is carried out if appropriate. The audio data in this case need to be provided particularly as PCM data for further transmission via the communication networks 51, 52, 53. Otherwise, there are no changes over the exemplary embodiment described previously. In addition, it is pointed out that the communication device may be in a form such that it cannot convert a text file into a voice file. It is then used merely to implement the modified exemplary embodiment.

The invention claimed is:

1. A method for transmitting data to at least one communication end system from a sending end system, comprising:

receiving a volume of data at a sending end system which needs to be transmitted to at least one communication end system, integrating at least one reception address into the volume of data, with a reception address respectively identifying a communication end system, transmitting the volume of data from the sending end system via a first communication network to a communication device, converting at the communication device the volume of data into a voice signal in the form of PCM data, provided that the volume of data does not already contain a voice signal, respectively setting up a connection from the communication device via the first or a second communication network to a communication end system using the appropriate reception address, transmitting the voice signal from the communication device to the communication end system whenever the connection is accepted, and playing back the voice signal on the communication end system, wherein the first communication network is a packet-switched network and the volume of data is transmitted to the communication device as an e-mail, characterized in that the voice signal contains voice information including instructions which inform the user of a plurality of alternative reaction options for response to said voice signal and triggering thereof, and regarding how the user of the communication end system can respond to the voice signal wherein the voice information including instructions which inform the user of a plurality of alternative reaction options for response to said voice signal is at least one of:

appended by the communication device to the voice signal received from the sending end system; and incorporated in the volume of data transmitted by the sending end system to the communication device.

2. The method as claimed in claim 1, characterized in that the second communication network is a circuit-switched network and the voice signal is transmitted to a communication end system by means of circuit switching.

3. The method as claimed in claim 1, characterized in that the second communication network is a mobile radio network and the voice signal is transmitted to the communication end system via at least one radio link.

4. The method as claimed in claim 1, characterized in that data are transmitted from the communication device to the communication end system using VoIP technology.

5. The method as claimed in claim 1, further comprising sending an acknowledgement regarding playback of the voice signal triggered by the user of the end system.

6. The method as claimed in claim 5, characterized in that the acknowledgement is transmitted as an inband signal.

7. The method as claimed in claim 5, characterized in that the acknowledgement is transmitted as an out-of-band signal.

8. The method as claimed in claim 5, characterized in that the acknowledgement is transmitted to the communication device and from this to the sender of the volume of data.

9. The method as claimed in claim 5, characterized in that the acknowledgement is transmitted directly to the sender of the volume of data, with the sender information being transmitted together with the voice signal from the communication device to the communication end system.

10. The method as claimed in claim 5, characterized in that an acknowledgement of successful playback of the voice signal is triggered by a defined key or key combination.

11. The method as claimed in claim 5, characterized in that the voice signal contains voice information including instructions regarding how the user of the communication end system produces a YES response or a NO response.

12. The method as claimed in claim 5, characterized in that a voice response from the user of the communication end system is detected and is evaluated by means of voice recognition.

13. The method as claimed in claim 1, characterized in that the communication end system is or comprises a digital or analog telephone or a mobile radio terminal.

14. The method as claimed in claim 1, characterized in that a Busy situation or nonacceptance of the call involves an attempt being made to set up a fresh connection after a particular time.

15. The method as claimed in claim 1, characterized in that if the communication end system accepts a call using a telephone answering machine then the voice signal is spoken onto the telephone answering machine.

16. The method as claimed in claim 1, characterized in that the sender of the volume of data is informed by the communication device of the state of the connection setup and the transmission of the voice signal to the communication end system.

17. The method as claimed in claim 1, characterized in that the volume of data contains a list with a plurality of reception addresses, and the voice information is transmitted to a plurality of communication end systems.

18. The method as claimed in claim 1, characterized in that the volume of data is or contains a text file.

19. The method as claimed in claim 1, characterized in that the volume of data is or contains a digital audio file.

20. The method as claimed in claim 1, characterized in that if the volume of data received on the communication device is already a voice signal then format conversion and/or conditioning of the voice signal takes place in the communication device.

21. A communication device for transmitting from a sending end system to at least one communication end system a volume of data, wherein at least one reception address is integrated into the volume of data, with a reception address respectively identifying a communication end system, said communication device comprising:
a first interface for receiving data sent as an e-mail from a sending end system via a packet-switched network,
at least one second interface for transmitting voice signals to said communication end system,
a device which is provided to receive data from the first interface and to convert the received data into voice signals in the form of PCM data, provided that they are not yet in the form of voice signals, and to forward the voice signals to the interface for transmitting voice signals, and
a unit for interpreting inband and/or out-of-band information to recognize an acknowledgement about reception of the voice signals, which is sent by the communication end system;
wherein the voice signal contains voice information including instructions which inform a user of the communication end system of a plurality of alternative reaction options regarding how the user can respond to the voice signal and triggering thereof and
wherein the voice information including instructions which inform the user of a plurality of alternative reaction options for response to said voice signal is at least one of:
appended by the communication device to the voice signal received from the sending end system; and
incorporated in the volume of data transmitted by the sending end system to the communication device.

22. The communication device as claimed in claim 21, characterized by a data packet reception unit which is designed to recognize text contained in the received data or digital audio data contained in the received data and to make it/them available for further treatment.

23. The communication device as claimed in claim 22, characterized in that the data packet reception unit is designed to recognize text in e-mail files and to make it available for further treatment.

24. The communication device as claimed in claim 22, characterized in that the data packet reception unit recognizes digital audio data in the attachment to an e-mail and makes them available for further treatment.

25. The communication device as claimed in claim 21, characterized by a message playback unit which converts a text message internally into a voice signal and digitally encodes the converted voice signal.

26. The communication device as claimed in claim 21, characterized by a message playback unit which checks digital audio data received by the first interface to determine whether format conversion and/or conditioning is required and performs such processing if appropriate.

27. The communication device as claimed in claim 21, characterized by a unit for connection control which controls the call setup and any data transmission to the communication end systems to which the voice signals are to be transmitted, a call being set up using receiver information which has been appended to data received by the first interface.

28. The communication device as claimed in claim 21, characterized in that the communication device also comprises a switching matrix.

29. The communication device as claimed in claim 21, characterized in that the at least one interface for transmitting voice signals is a TDM, mobile radio or VoIP interface.

* * * * *